Dec. 27, 1966  J. A. M. LE DUC  3,294,586
FUEL CELL WITH MOVABLE CASING AND ELECTRODES AND
METHOD FOR OPERATING FUEL CELL WITH AN ANODE
CONTAINING AN ALKALINE EARTH METAL
Filed March 1, 1962  4 Sheets-Sheet 1

INVENTOR.
JOSEPH ADRIEN M. LEDUC
BY G. H. Palmer
Maujlin Klosty  John C. Quinlan
AGENT  ATTORNEYS

INVENTOR.
JOSEPH ADRIEN M. LEDUC

Dec. 27, 1966  J. A. M. LE DUC  3,294,586
FUEL CELL WITH MOVABLE CASING AND ELECTRODES AND
METHOD FOR OPERATING FUEL CELL WITH AN ANODE
CONTAINING AN ALKALINE EARTH METAL
Filed March 1, 1962  4 Sheets-Sheet 3

INVENTOR.
JOSEPH ADRIEN M. LEDUC

BY  *G. H. Palmer*
*Maurlin Klosty*   *John C. Quinlan*
AGENT  ATTORNEYS

Dec. 27, 1966 J. A. M. LE DUC 3,294,586
FUEL CELL WITH MOVABLE CASING AND ELECTRODES AND
METHOD FOR OPERATING FUEL CELL WITH AN ANODE
CONTAINING AN ALKALINE EARTH METAL
Filed March 1, 1962 4 Sheets-Sheet 4
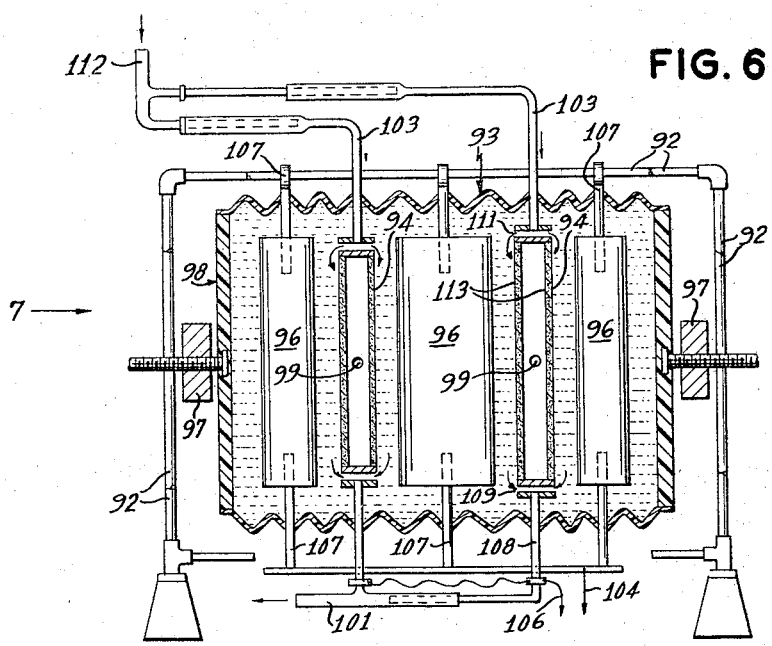
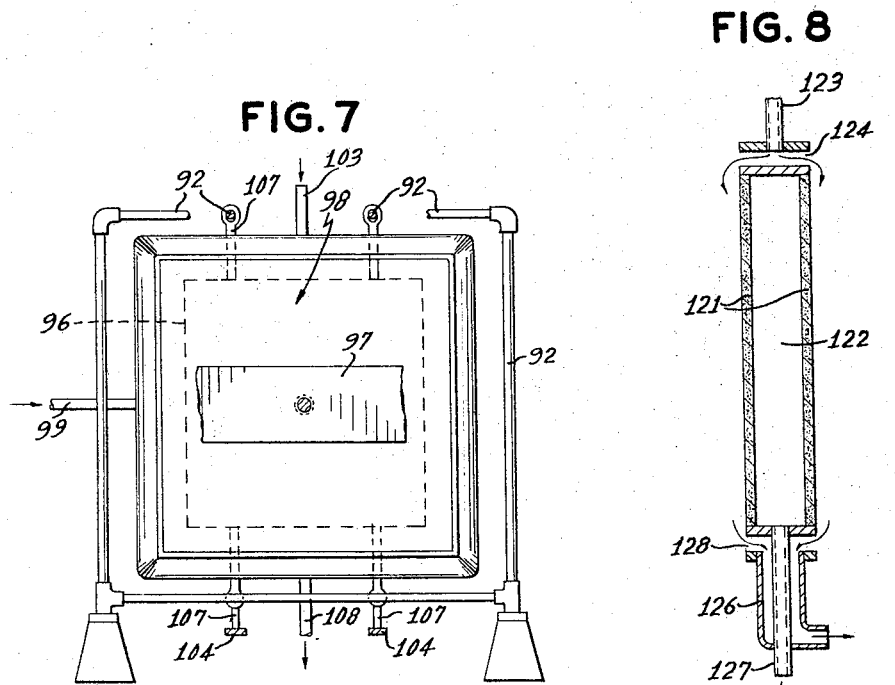
INVENTOR.
JOSEPH ADRIEN M. LEDUC
BY
AGENT ATTORNEYS United States Patent Office 3,294,586
Patented Dec. 27, 1966

3,294,586
FUEL CELL WITH MOVABLE CASING AND ELECTRODES AND METHOD FOR OPERATING FUEL CELL WITH AN ANODE CONTAINING AN ALKALINE EARTH METAL
Joseph Adrien M. Le Duc, Short Hills, N.J., assignor to Pullman Incorporated, a corporation of Delaware
Filed Mar. 1, 1962, Ser. No. 176,532
26 Claims. (Cl. 136—86)

This invention relates to a new and improved process for converting the energy liberated by a chemical reaction directly into electrical energy. In a more particular aspect the present invention relates to an improved fuel cell capable of generating current of a relatively higher voltage.

It is known that considerable time and money are being expended in order to develop electrochemical devices commonly referred to as fuel cells which are capable of transforming the energy released by chemical reaction directly into electrical energy. For each system, the theoretical or standard cell potential can be calculated using thermodynamic principles from the following equation:

$$E^0 = \frac{4183 \Delta F^0}{-nF}$$

wherein $E^0$=standard cell potential, volts (with reactants and products in a state of unit activity)
$\Delta F^0$=standard free energy change for the cell reaction in question, kilocalories
$n$=number of electrons transferred in the cell reaction (equivalents)
$F$=the faraday, 96,500 coulombs per equivalent.

It is seen, therefore, that the theoretical cell potential or E.M.F. (electromotive force) of any particular fuel cell is related to the free energy change associated with the chemical reaction taking place therein.

One type of fuel cell which has received considerable attention is the high pressure hydrogen-oxygen fuel cell; in this cell, hydrogen is used as fuel coupled with oxygen as the oxidant and is usually operated at a higher temperature of about 250–400° F., a pressure of from 300–600 pounds per square inch using about 20–40 percent aqueous potassium hydroxide as electrolyte. The calculated open circuit potential (O.C.P.) of this cell is 1.17 volts. The low temperature hydrogen-oxygen fuel cell which is usually operated at a temperature of 140–160° F. and at about ambient pressure to 150 pounds per square inch has a slightly higher calculated E.M.F. of 1.23 volts.

Another type of power cell is the so-called consumable electrode fuel cell. An example of this type is the sodium amalgam-oxygen fuel cell, the calculated open circuit potential of which is 2.2 volts when operated at 150° F. and ambient pressure using aqueous sodium hydroxide electrolyte and amalgam containing about 0.5 percent by weight of sodium. Although the E.M.F. based on the use of pure sodium is higher, advantage of the difference in free energy cannot be taken thereof in view of the high reactivity of pure sodium with the aqueous electrolyte. Another disadvantage, of course, is the fact that there are hazards involved in handling pure sodium as well as sodium in a dissolved state. In practice the open circuit voltage of the sodium amalgam-oxygen system varies with the concentration of the electrolyte; for example, when using 10–20 percent aqueous sodium hydroxide, the voltage is 1.9–2.1 volts (O.C.P.) and when using a 45–50 percent solution, the voltage is 1.5–1.6 volts (O.C.P.). When the cell is operating under load, the voltage is, of course, substantially lower than the open circuit voltages. Thus, another disadvantage of the sodium amalgam-oxygen fuel cell system is that the fuel cell output varies considerably with the concentration of the electrolyte due in part to a marked difference in the activities of the solutions.

The voltage of an operating fuel cell is always less than the calculated cell potential, the decrease being due to certain unavoidable losses such as energy associated with the preparation of the fuel to a form suitable for use in the cell, polarization (activation, concentration, etc.), voltage drop caused by ohmic resistance as the current flows through electrodes, electrolyte and current conductors. It can be seen, therefore, than on an average basis fuel cells developed to date are capable of producing current of only lower voltage of the order of about 0.9–2.0 volts (O.C.P.) even at elevated temperatures, leaving much to be desired in the way of increasing power output. It also is manifested that any fuel cell which allows operation for even a few tenths of a volt higher represents, on a percentage basis, a large increase in power and a valuable contribution to the efficiency of fuel cells.

It is an object of this invention to provide an improved fuel cell capable of generating current of relatively higher voltage.

Another object is to provide a power cell from which high current densities can be drawn with minimized loss in power performance.

Another object is to provide a fuel cell having a good power output when operated at ambient temperatures and pressures.

Another object is to provide a fuel cell in which an aqueous electrolyte is employed and which generates current of higher voltage than presently known fuel cells.

A further object is to provide a fuel cell which is readily adapted to continuous operation for a prolonged period of time without the necessity of continuously charging fuel from an external source.

A further object is to provide a fuel cell having the above characteristics and in which the fuel is one that is readily stored and handled.

A still further object is to provide a power cell which, in addition to its value as a source of electrical current, also leads to the production of a valuable by-product.

A still further object is to provide an improved fuel cell and design therefor of the consumable electrode type.

Various other objects and advantages of this invention will become apparent to those skilled in the art from the accompanying description and disclosure.

Accordingly the above objects are accomplished by the process which comprises reacting a fuel comprising an alkaline earth metal and an oxidant electrochemically in an aqueous medium in a cell provided with means for bringing the fuel and oxidant into the proximity of suitable electrodes at which the electrochemical reactions take place and from which the current produced within the cell is withdrawn. Of the alkaline earth metals employed, i.e., strontium, calcium and barium, barium metal is preferred and thus, for illustrative purposes and convenience, the following discussion is drawn primarily to the use of barium as the fuel. The oxidizing agent includes oxygen and the halogens (chlorine, fluorine, bromine and iodine), of which oxygen and chlorine are preferred.

During operation of the power cell of this invention, the alkaline earth metal fuel is oxidized to the respective positively charged ions releasing electrons at the electrode (anode) with which it is in contact. The oxidation or anodic reaction which takes place during the electrochemical process of this invention, and the calculated E.M.F. thereof are as follows:

$2Ba \rightarrow 2Ba^{++} + 4e \qquad E^0 = 2.90$ volts $\qquad (1)$

While the fuel is being oxidized at the anode, the oxidant is being reduced at the other electrode and passes into the aqueous medium as negatively charged ions. It is to be understood that, unless indicated otherwise, the term "oxidant" as used herein to describe the reactant which is brought into proximity with the cathode, is intended to include any agent capable of accepting electrons, and includes oxygen and the halogens. The term "oxygen" as used herein includes pure molecular oxygen as well as oxygen-containing gases such as air and mixtures of oxygen with nitrogen or other inert gases in all mole ratios. When oxygen is used as the oxidant, the reduction or cathodic reaction which takes place and the calculated potential thereof are as follows which assumes that no peroxide ion is formed:

$$O_2 + 2H_2O + 4e \rightarrow 4OH^- \qquad E^0 = 0.401 \text{ volt} \qquad (2)$$

However, it is known that peroxide ion formation occurs according to the following equation:

$$O_2 + H_2O + 2e \rightarrow HO_2^- + OH^- \qquad (3)$$

the theoretical potential of which is minus 0.078 volt. The formation of peroxide ions can be inhibited by the presence of a catalyst such as silver, manganese, nickel, cobalt, iron, rare earth metals, etc., to decompose or prevent the formation of the peroxide ion according to the following equation:

$$HO_2^- \rightarrow OH^- + O_2 \qquad (4)$$

The following equation expresses the dependence of the oxygen half cell on the activity (a) of peroxide ion which may form:

$$E = -0.030 \log a_{HO_2^-} - 0.052 \qquad (5)$$

As the activity or concentration of peroxide is decreased, the potential of the oxygen half cell increases as shown by the following tabulation:

| $a_{HO_2^-}$ | E (volts) |
|---|---|
| 1 | −0.052 |
| $10^{-5}$ | +0.10 |
| $10^{-10}$ | +0.25 |

Thus the net chemical reaction of the barium-oxygen system is:

$$2Ba + O_2 + 2H_2O \rightarrow 2Ba^{++} + 4OH^- \qquad (6)$$

and the calculated E.M.F. thereof varies approximately between 3.30 volts and 2.8 volts, depending upon the activities of the various reacting species.

When chlorine is used as the oxidant, the reduction reaction which takes place at the cathode, and the calculated E.M.F. thereof are as follows:

$$Cl_2 + 2e \rightarrow 2Cl^- \qquad E^0 = 1.36 \text{ volts} \qquad (7)$$

the net reaction of the barium-chlorine fuel cell system and calculated E.M.F. thereof being as follows:

$$Ba + Cl_2 \rightarrow Ba^{++} + 2Cl^- \qquad E^0 = 4.26 \text{ volts} \qquad (8)$$

The effect of peroxide formation is not considered in this system when chlorine is used as the oxidant.

In accordance with the process of this invention, the above electrochemical reactions are effected by bringing the metallic fuel such as barium and the oxidant into contact with suitable electrodes in an aqueous electrolyte. Although the electrolyte may initially be water without an added ionizable compound, for more efficient operation and improved conductivity, at least one water soluble ionizable compound is preferably added as a component of the electrolyte system. When the oxidant is oxygen, the aqueous electrolyte is usually alkaline and for this purpose there is used any water soluble compound which when in solution renders the medium alkaline and which does not impair the chemical reactions taking place at the electrodes. For example, metal hydroxides such as the alkali metal and alkaline earth metal hydroxides as well as soluble metal oxides, and any combination thereof are suitable. Typical examples of such alkaline-producing compounds are sodium hydroxide, potassium hydroxide, lithium hydroxide, barium hydroxide, calcium hydroxide, strontium hydroxide, and soluble oxides such as barium oxide, calcium oxide and strontium oxide.

The initial concentration of the added alkaline compound may vary over a relatively wide range such as from very dilute solutions to saturated solutions, the concentration depending upon the solubility of the particular compound employed. For example, in the case of the alkali metal hydroxides the concentration thereof may vary between about 0.05 and about 20 molar and is preferably between about 0.1 and about 5 molar. In the case of the less soluble alkaline metal hydroxides such as those of the alkaline earth metals, the cencentration employed is usually saturated (from about 0.2 to about 6.0 molar) at the operating temperature of the cell. In this respect, it is noted that when barium, for example, is employed as the fuel, barium hydroxide forms and due to its relatively low solubility it usually precipitates from the aqueous medium without an adverse effect on the performance of the cell. The barium hydroxide is readily recovered as a valuable product of the process of this invention by simple liquid-solid separation techniques.

When the halogens are used as the cathode reactant or oxidant, an electrolyte is usually added to the aqueous medium which yields ions of the same type which are being formed at the cathode. For this purpose, the alkali metal and alkaline earth metal halides are suitable.

For example, when chlorine is used as the oxidant, typical examples of suitable added electrolytes are sodium chloride, potassium chloride, barium chloride, strontium chloride and any combination thereof. When the oxidant is a halogen, the aqueous medium may be acidic or alkaline. Inasmuch as the chemical reactivity of barium is less in an alkaline medium than in acidic solutions, the cell is usually operated using an aqueous medium which contains, in addition to the metal chloride, an added hydroxyl-yielding compound such as one of the above-mentioned metal hydroxides or oxides.

The temperature at which the electrolyte is maintained and at which the fuel cell is operated varies between about 20 and about 250° C. The cell also may be operated over a wide range of pressure and generally the pressure is between atmospheric and about 700 pounds per square inch. Any combination of pressure and temperature may be employed with the preferred limitation that they be so regulated to maintain the electrolyte in the liquid phase. The preferred operating temperature ranges between about 20° C. and about 90° C. Although good performance is realized at room temperature and atmospheric pressure, the electrode surface tends to increase in temperature when the cell is operated at high current densities of the order of about 200 to 300 amperes per square foot of apparent electrode surface and higher. Thus from the standpoint of continuous generation of current of such high intensities it is usually preferred to pressure the cell even when operating at room temperature.

It is to be understood that the term "apparent electrode surface" as used herein with respect to expressing current density, is defined as the geometric dimensions of the electrode without consideration of the surface area contributed by the porous surface of the particular electrode.

The fuel cell of this invention is operated at any desired current density and voltage depending upon the design of each individual cell and the manner in which two or more cells are interconnected.

The accompanying graphs of FIGURES 1 and 2, are the power curves of the barium-oxygen and barium-chlorine fuel cells, respectively, of this invention.

Reference to these curves shows that the power cells of this invention generate electrical energy of current densities up to about 1000 amperes per square foot of apparent electrode surface or higher. Within these current densities, the cell potential of the barium-oxygen fuel cell in which aqueous barium hydroxide is used as the electrolyte (FIGURE 1) ranges between 2.6 and about 1.2 volts which corresponds to power densities, on the basis of 100 and 1000 amperes per square foot, of between about 170 and about 1200 watts per square foot of electrode surface. For the barium-chlorine system in which an aqueous solution comprising barium chloride is used, for example (FIGURE 2), the cell potential varies between 3.5 and about 1.8 volts which corresponds to power densities, on the basis of 100 and 1000 amperes per square foot, of between about 275 and about 1800 watts per square foot of electrode surface.

When it is desired to produce current of high amperage and low voltage, individual fuel cells are connected in parallel and in producing current of low amperage and high voltage, individual fuel cells are connected in series as known to those skilled in the art.

For a further understanding of the present invention, reference is made to FIGURES 3-8 of the accompanying drawings.

FIGURES 3-6 represent longitudinal views in elevation of apparatus in which the electrochemical reactions of this invention are effected.

FIGURE 7 is an end view of the apparatus shown in FIGURE 6 taken on line 7—7.

FIGURE 8 is a longitudinal view in elevation of an improved cathode assembly.

Figure 3:
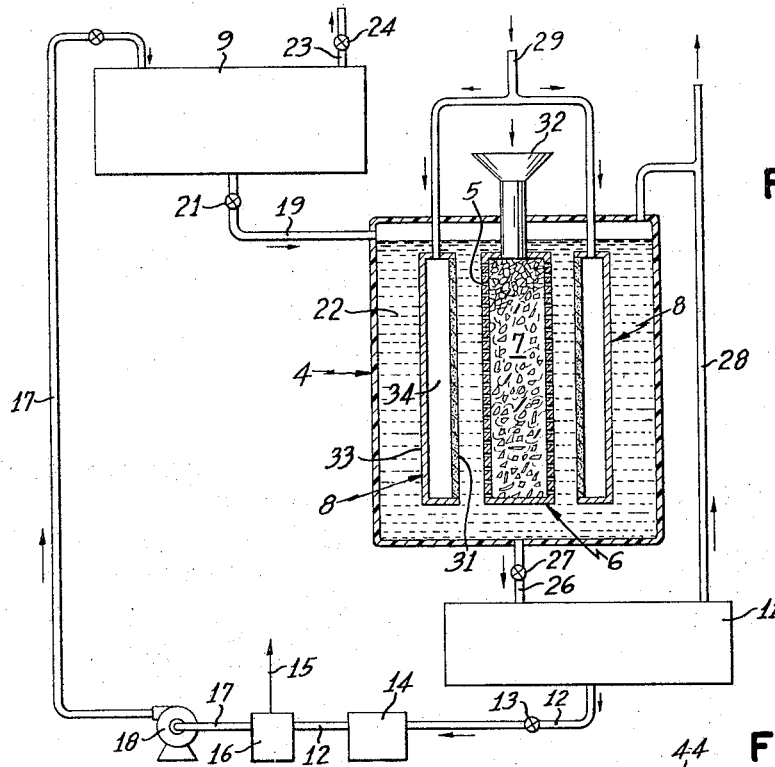

The barium-oxidant fuel cell illustrated by accompanying FIGURE 3 comprises the cell container 4 having disposed therein electrodes typically illustrated by electrode assembly 6 and 8, and is provided with electrolyte feed source 9 and electrolyte reservoir 11, reservoir 11 being connected to the electrolyte feed source 9 by means of lines 12 and 17 having cooler 14, filtration zone 16 and pump 18 thereon.

The inner walls of the cell body 4 are composed of any suitable material or coated material which is chemically inert to the electrolyte and chemicals produced by the cell and is also an electrically non-conductive material such as vinyl or other plastic or resin, rubber, refractories, or coated metals. The cell body may have a cross section of any desired shape such as circular, rectangular or square.

The barium fuel 7 is in the form of particles of any suitable and convenient shape and dimensions such as chunks, wires, chopped wires, broken pieces or slices of barium. The fuel also may be used in the form of fluidized particles. That portion of fuel electrode 6 having barium fuel 7 contained therein which is submerged in electrolyte 22 is composed of an electroconductive metal such as steel, stainless steel, nickel, etc. At least that portion of fuel electrode 6 which faces gas electrode 8 is in the form of a screen or other perforated or porous structure 5 having apertures sufficiently small to retain the fuel particles within the electrode. Fuel electrode 6 is provided with a means for introducing fuel particles to the interior of the electrode. Although the fuel inlet 32 is shown in FIGURE 3 as a funnel-shaped inlet port, it is to be understood that any automatic feeding devices are suitable. The inlet port may be connected to means (not shown) in which the barium fuel is machined to the desired particle size and shape.

The gas electrode employed in the fuel cells of this invention comprises an electrically conductive material through which the gaseous oxidant diffuses towards the surface in contact with the electrolyte. The electroconductive material is any one of the elements of Groups IB, IIB, III–VIII, inclusive, of the Periodic Chart of the elements, as well as the race earth metals and any combination thereof. The conductor may be in the form of sintered powder or specially prepared porous metal, or carbon. Also included within the scope of this invention is a gas diffusion electrode comprising the electrically conductive metal including salts, oxides, etc., thereof homogeneously distributed at least within the pores of an inert substrate such as polyethylene prepared in accordance with the methods disclosed in my prior and copending application Serial Number 162,221, filed December 26, 1961, now Patent No. 3,235,473. The cathode also may be composed of carbon or graphite and may contain catalysts such as silver-silver salt additives.

In view of the fact that the oxidant which is brought into contact with the electrolyte and which undergoes chemical reaction is in the gaseous state, it is preferred that the cathode be in the form of a hollow member provided with an inlet for introducing the gaseous reactant therein. One such form is illustrated by gas electrodes 8 of the accompanying FIGURE 3 which comprises the electrically conductive porous surface 31 and support 33 which together enclose space 34 into which the gaseous oxidant is introduced under a slight pressure by means of inlet 29 which feeds each of gas electrodes 8.

In operating the cell of FIGURE 3, aqueous electrolyte 22 containing barium hydroxide, for example, is fed to the cell from reservoir 9 by means of line 19 having valve 21 thereon in an amount sufficient to fully immerse electrodes 6 and 8. As the electrochemical reactions proceed, barium ions form and when the electrolyte becomes saturated with barium hydroxide, it is withdrawn from the lower portion of the cell by means of line 26 having valve 27 thereon into electrolyte reservoir 11. The electrolyte is then passed into cooler 14 by means of line 12 having valve 13 thereon wherein the electrolyte is cooled to precipitate barium hydroxide. The solution and precipitate are then passed to filtration zone 16 wherein solid barium hydroxide is separated and withdrawn therefrom by means of line 15 as a product of the process. The filtrate is then pumped through line 17 by means of pump 18 and is returned to electrolyte feed reservoir 9. The cell is also provided with vents 23 and 28 to prevent build-up of water vapor pressure within the respective electrolyte reservoirs, and by means of which unreacted gases are vented. When the fuel cell is not in operation, electrolyte is removed therefrom and is conveniently stored in reservoir 11 so that the barium fuel is not in contact with the aqueous electrolyte.

Figure 4:
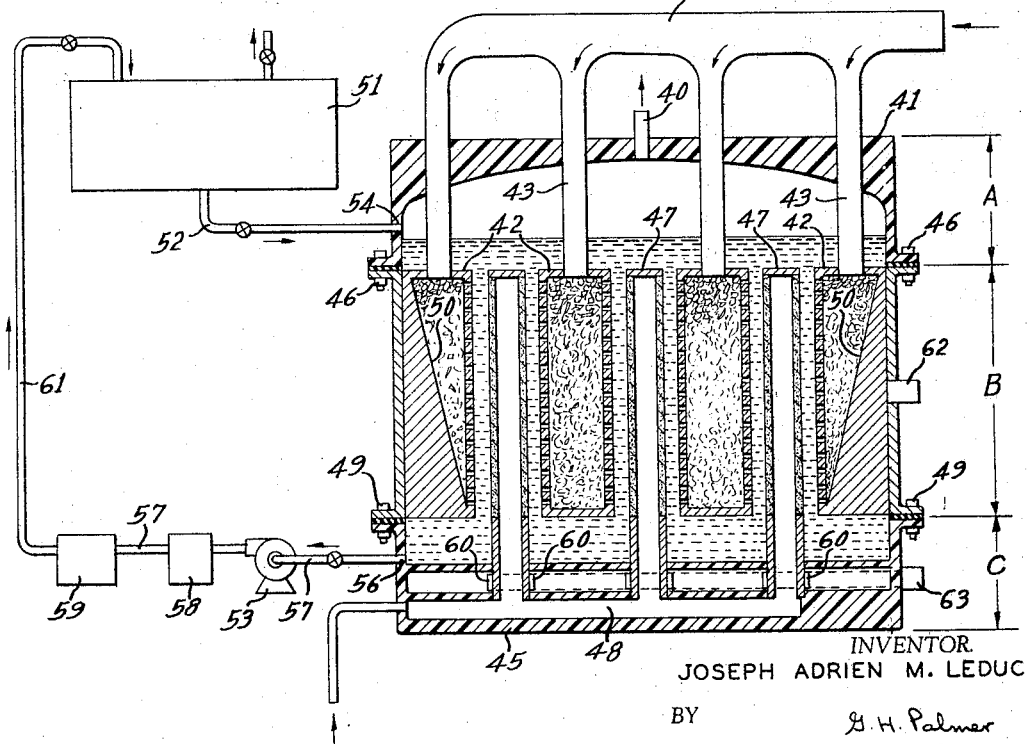

It is to be understand that although the fuel cell of FIGURE 3 is shown with the single barium electrode positioned between two gas diffusion electrodes the cell may contain any number of alternating barium and gas diffusion electrodes in which case the type of gas electrode shown in the drawing is positioned at either end of the cell and the other gas electrodes have a completely reactive and conductive porous surface as illustrated by the accompanying FIGURE 4.

In accordance with the accompanying FIGURE 4 a three-section fuel cell is typically illustrated comprising: (A) an upper section or dome 41 having vent 40 which is connected to the middle section of the cell by any suitable means such as bolts 46; (B) the middle or anode section comprising fuel electrodes 42 connected to barium feed inlet 43 which in turn is connected to manifold 44; and (C) the bottom section comprising the base of the cell 45 connected to the middle section by bolts 49, and to which the gas diffusion electrodes 47 and current distribution grids 60 (wires or bars) are fastened and attached to cathode terminus 63. The upper section (A) and lower section (C) of the cell are composed of, or coated with, an electrically non-conductive material and may be, for example, cement or coated metals, whereas the middle section (B) is made of an electrically conductive material such as steel or other metal.

Barium electrodes 42 are of the type described above in connection with FIGURE 3 and comprise barium particles contained within the perforated support. In order to facilitate the flow of barium particles into the end electrodes and to avoid the accumulation of particles therein which do not become subjected to the electrochemical reaction taking place at the surface thereof, they are shaped as shown, the terminal portions 50 having a substantially triangular cross section and being composed of a solid conductive material connected to the walls of the metallic middle section (B) having anode terminus 62 thereon.

As shown in FIGURE 4 of the drawing, the barium electrodes 42, except for the outer ones, are positioned between the reactive porous surface of gas electrodes 47 which are fed with oxidant by means of inlet 48 positioned in the base of the cell, the gas flowing in an upwardly direction. In operation, the barium and oxidant are fed to the anode and the cathode, respectively, and aqueous electrolyte is fed to the cell from electrolyte reservoir 51 by means of line 52 and cell inlet 54. As shown in the drawing the electrolyte is pumped in a downwardly direction passing between the outer surfaces of the anodes and cathodes. It is to be understood, however, that the electrolyte may also be charged to the cell by means of an inlet positioned within the lower section of the cell such that the flow is in an upwardly direction. The lower section (C) of the cell is provided with electrolyte outlet 56 which in turn leads into line 57 having pump 53 thereon, the electrolyte again being passed into cooler 58, filtration zone 59 and through line 61 into electrolyte reservoir 51 as described above.

The type of cell structure shown in FIGURE 4 is readily disassembled, which feature is particularly advantageous when it becomes necessary to clean the cell, replace component parts and electrodes or transport the cell.

The fuel cells of this invention are such that fuel may be stored within the cell in any amount required to operate it for a prolonged period of time without the necessity of carrying fuel by external means or continuously charging fuel to the cell. In accordance with this embodiment of the present invention, the cell is charged with a predetermined quantity of barium in the form of solid plates or blocks, the quantity being calculated according to the power demand. As the electrochemical reactions proceed, barium metal is consumed by conversion to barium ions and the thickness of the block of fuel is decreased while the gap of electrolyte between the fuel electrode and the gas diffusion electrode is correspondingly increased. The gap of electrolyte is usually maintained between about 0.07 and about 0.25 inch. As the barium metal is consumed the blocks of barium are moved by mechanical or motor-driven means towards the gas diffusion electrodes in order to maintain the distance between them. The displacement of the electrodes can be monitored by a sensing device located between the electrodes which, upon demand (external load, gap or electrolyte), is moved accordingly. A constant displacement is effectuated when the external load is constant. This particular embodiment of the present invention is illustrated by the accompanying FIGURES 5 and 6, which illustrate two means of accomplishing movement of the electrodes, namely, by the sliding assembly of FIGURE 5 and the accordion-like cell shown in FIGURE 6.

Figure 5:
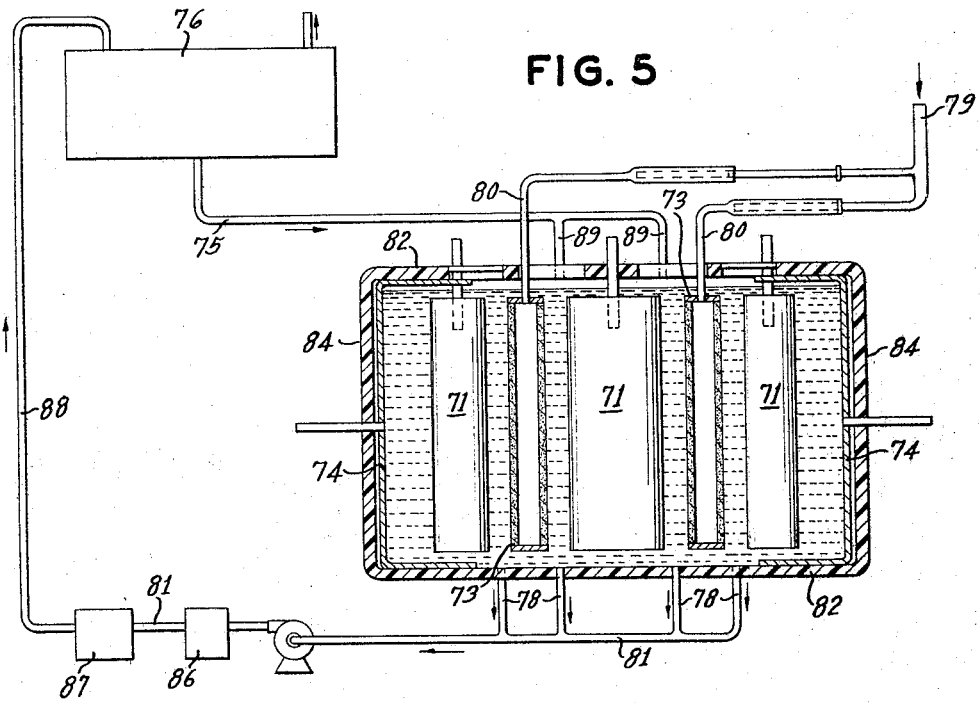

The cell illustrated by FIGURE 5 comprises fuel electrodes 71 in the form of solid blocks of barium having positioned therebetween gas diffusion electrodes 73 which are fed with oxidant by means of inlet 79. Electrolyte is fed to the cell by means of inlet manifold 75 which is fed electrolyte from source 76.

The casing of the cell body comprises walls 82 and 84 which enclose the inner movable walls 74. To accomplish movement of the electrodes as the barium fuel is consumed, pressure is exerted on inner section 74 by mechanical or electrically driven means causing section 74 to move inwardly thereby also moving the fuel electrodes along the upper part of the cell casing 82. Additional support is provided for barium electrodes 71 by connecting them to lower casing 82 in which event the lower casing is also provided with means for movement of the electrodes such as the sliding means shown within the top casing. The connecting lines such as oxidant manifold 79, electrolyte inlet 75, as well as electrolyte outlet 81 are constructed of flexible tubing in the form of a coil or spring, or as shown in the drawing specifically with respect to manifold 79, they may be composed of sections which slide or pass one within the other like the sections of a telescope. Another means for effecting movement of the gas diffusion electrodes, electrolyte inlet and outlet lines, comprises rolling connecting lines 80, 89 and 78, respectively, along their respective distributing manifolds. The circulation of electrolyte and removal of precipitated barium hydroxide product is accomplished as described above by passing the electrolyte from the cell through outlet 81 into cooler 86 through filtration zone 87, line 88 and into electrolyte reservoir 76.

Another illustration of apparatus particularly useful for operation of the cell to which a predetermined quantity of barium metal is charged is illustrated by the accompanying FIGURE 6. This apparatus comprises support bars 92 having disposed therein bellows 93 to which gas electrode assembly 94 and fuel electrodes 96 are fastened by line 108 and bars 107, respectively. The bellows themselves are interconnected by end bars 98 having plates 97 fastened thereto. The gas and fuel electrodes are also connected to the upper and lower support beams 92 by means such that the electrodes are readily moved such as by rolling or sliding means along the support. In operation, oxidant is fed to the gas electrodes by means of inlet 99 and aqueous electrolyte is charged to, and discharged from, the cell by means of movable manifolds 112 and 101, respectively, which are connected directly to the gas electrodes by the individual inlet 103 and outlet 108, respectively.

As the barium metal is consumed, pressure is exerted by various means on plates 97 causing end plates 98 to move inwardly thereby also effectuating contraction of bellows 93 and concomitant movement of the electrodes inwardly. As noted above in connection with FIGURE 5, the displacement of the assembly can be monitored by a sensing device located between the electrodes which, upon demand, are moved accordingly. The fuel and gas electrodes are connected to flexible and movable bus bars 104 and 106, respectively, by means of which current is withdrawn from the cell.

The accompanying FIGURE 7 is an end view of the cell illustrated in FIGURE 6, the numerals being the same as those employed to designate the corresponding parts shown in side elevation.

As shown in detail in FIGURE 6, gas diffusion electrodes 94 comprise: an inner hollow section to which gaseous oxidant is fed through inlet 99 leading into the middle section of the electrode, the two electroconductive porous surfaces 113, upper section 103 through which electrolyte is fed from distributing manifold 112 and from which electrolyte passes into the cell through apertures 111, and a lower section 108 having apertures 109 through which electrolyte flows and passes out of the cell and into electrolyte outlet manifold 101. As shown in FIGURE 6, the upper and lower apertures 111 and 109, respectively, of gas electrodes 94 may either be aligned with the fuel electrodes as shown by electrode 94 positioned to the left of the center fuel electrode, or above and below the fuel electrode as shown by the electrode positioned to the right of the center fuel electrode. The latter type of electrode is usually preferred inasmuch as it allows operation of the gas diffusion electrode at a current density approximately equivalent to that of the fuel electrode. This type of gas electrode which has the additional function of serving as the inlet and outlet for electrolyte is particularly suitable for the type of fuel cell illustrated by FIGURES 5 and 6 It is to be understood, however, that such gas diffusion electrodes may also be used in fuel cells in which barium fuel is continuously fed to the system.

A modification of the above-described gas electrodes 94 is illustrated by FIGURE 8 and essentially comprises electroconductive porous surfaces 121 through which the oxidant diffuses from enclosed space 122 to which gas is fed by means of inlet 127. The upper portion of the electrode comprises inlet 123 having openings 124 through which the aqueous electrolyte is fed to the cell. The lower portion of the electrode also comprises electrolyte outlet 126 having openings 128 through which electrolyte flows and passes out of the cell. Oxidant inlet 127 and electrolyte outlet 126 may be two separate tubes or, as shown in the drawing, may be positioned in concentric relationship.

In accordance with another embodiment of the process described herein, the alkaline earth metal fuel is used in combination with another metal component including elemental metals and intermetallic compounds, as well as hydrides, carbides, nitrides and metal salts. For example, alloys of the alkaline earth metal with one or more of the following metals may be employed: metals of Group IB such as copper, silver and gold; metals of Group IIA such as magnesium; metals of Group IIB such as cadmium, zinc and mercury; metals of Group IIIA such as aluminum; metals of Group IVA such as lead and tin; metals of Group VA such as bismuth and antimony; metals of Group VIB such as chromium, molybdenum and tungsten; the iron group metals of Group VIII, i.e., iron, cobalt, and nickel, as well as the rare earth metals such as lanthanum. In addition to alloys of the alkaline earth metal with another elemental metal, the term "alloy" as used herein is also intended to include admixtures of the alkaline earth metal with nitrides, carbides and hydrides of one of the above-enumerated metals, and admixtures of the alkaline earth metal with intermetallic compounds such as selenides, silicides and tellurides.

The alkaline earth metal content of such alloys varies over a relatively wide range such as from 0.1 to 99 percent by weight based on the total weight of the alloy. In the case of the solid alloys, that is, other than liquid amalgams with mercury (i.e., amalgams containing a relatively low content of the alkaline earth metal of between about 0.1 and about 2 percent by weight), the alkaline earth metal is usually present as the major constituent. Thus in the case of the solid alloys, the alkaline earth metal content is usually at least 50 percent by weight based on the total weight of the alloy and is preferably between about 80 and about 98 percent by weight.

The solid alloys are prepared by various techniques. One method comprises melting of the alkaline earth metal and the alloying metal, admixing the melt and solidifying the mixture to form solid solutions of the alkaline earth metal and alloying component. For example, between about 85 and about 95 parts by weight of barium and correspondingly between about 15 and about 5 parts by weight of lead are melted and mixed to cast the alloy. In this manner, an alloy containing barium and lead in a weight ratio of 9:1, for example, is prepared and is particularly useful in the fuel cells described herein.

Another method of preparing the alloy comprises physically admixing solid particles of the alkaline earth metal and particles of the alloying metal under an inert atmosphere such as helium or argon. After thorough mixing, the admixture is compressed with or without the application of heat to pressures of the order of between about 2 and about 25 tons per square inch. Usually, the particle size of the alloying metal is less than that of the alkaline earth metal such that the finer particles also coat the particles of the alkaline earth metal. For example, a barium-zinc alloy in which the barium is also coated with particles of zinc is prepared by physically admixing thoroughly particles of barium (100 mesh) with very fine zinc powder (about −325 mesh) under a helium atmosphere in a weight ratio of barium to zinc of about 9:1 at a temperature of about 50° to about 100° C. (e.g., 75° C.) followed by compression of the admixture under a pressure of about 20 tons per square inch.

In accordance with another method of preparing the alloy, the alloying metal or salt thereof is melted and vaporized in an inert atmosphere when the metal is employed and in a hydrogen atmosphere when a salt is used, followed by deposition of the vapors onto the surface of the alkaline earth metal under an inert atmosphere. For example, in accordance with this technique, tin is vaporized at a temperature between about 1200° and 1300° C. under a vacuum of about 10–20 mm. mercury pressure and in an inert residual atmosphere such as helium or argon. When a halide of tin is employed, it is vaporized at about 600° C. in a hydrogen atmosphere. In each case, the vapors of tin are then brought into contact with barium particles (50–100 mesh) at the indicated temperature until the total concentration of tin deposited on the surface of the barium is between about 1 and about 8 percent by weight (e.g., about 2 percent) based on the total weight of the alloy. The coated particles are then cooled in the inert gas and molded by compression.

During operation of the fuel cells in which the alkaline earth metal is in the form of an alloy, the alloying metal may or may not enter into the electrochemical reaction and may or may not be anodized (or oxidized). For example, in the case of the amalgams, the mercury undergoes essentially no electrochemical change, being substantially inert and is recovered as mercury or depleted amalgams as the alkaline earth metal fuel is oxidized at the anode. In other cases anodization of the alloying component such as zinc, tin, lead, cadmium, aluminum and magnesium occurs. For example, when the fuel cell is operated using barium alloyed with zinc, oxygen as the oxidant and aqueous barium hydroxide electrolyte, zinc oxide is formed by anodization and passes into the electrolyte as zincate ion. Similarly, when the alloying component is tin, an oxide of tin is formed at the anode and passes into the electrolyte system as stannate ion. For the purpose of aiding oxidation of the alloying component, various oxidizing agents are added to the aqueous electrolyte bath such as the alkali metal salts of peroxyacids such as the alkali metal persulfates, pertungstates, percarbonates, perchromates, and perchlorates. Additionally, a compound may be added to the aqueous electrolyte system in order to form a complex with the alloying component or with the oxide thereof produced by anodization, and thereby effective removal of the alloying component as the alkaline earth metal is oxidized electrochemically. For example, when copper or magnesium is the alloying component, a suitable complexing agent is sodium ethylene diamine tetra-acetic acid; when iron is the alloying component, suitable complexing agents are the alkali metal salts of gluconic acid such as sodium gluconate, citrate, oxalate and heptanoate; and when nickel or cobalt are the alloying components, suitable complexing agents are the alkali metal cyanides such as sodium cyanide. Such complexing agents are usually added to the aqueous electrolyte system in an amount which is at least sufficient to complex the alloying component or a compound thereof.

As noted above, the alkaline earth metal may also be employed in combination with a salt of one of the above-enumerated metals, as well as with salts of the alkali metals and alkaline earth metals. For example, typical examples of such compounds are the sulfates, carbonates, halides, fluorides and oxides of barium, lead, tin, zinc, aluminum, lithium, sodium, potassium, strontium and calcium. The alkaline earth metal fuel such as barium is used advantageously when physically admixed or coated with such compounds which pass into the aqueous electrolyte system as the fuel is oxidized at the anode.

The above-described solid alloys and combination of the alkaline earth metal with a metal salt may be used in the form of particles and charged to the anode in the same manner as described above with respect to the use of barium particles in the above-described fuel cells of the accompanying FIGURES 3 and 4. In addition, the alloy or combination of fuel with a metal salt may be shaped into blocks or sheets and introduced into the aqueous electrolyte bath as the anode in the manner described above with respect to the operation of the fuel cells of the accompanying FIGURES 5 and 6.

As noted above, the alkaline earth metal also may be employed in the form of a liquid amalgam which usually contains between about 0.1 and about 2 percent by weight of barium. Such amalgams are prepared by a variety of methods. One method comprises simple dissolution of the alkaline earth metal in mercury within the aforesaid amounts. This is accomplished either directly, or by contacting barium chloride with sodium amalgam at about 90 to 100° F. The barium amalgam also may be derived from the electrolysis of aqueous barium chloride in an electrolysis cell in which a mercury cathode is employed.

Figure 9:
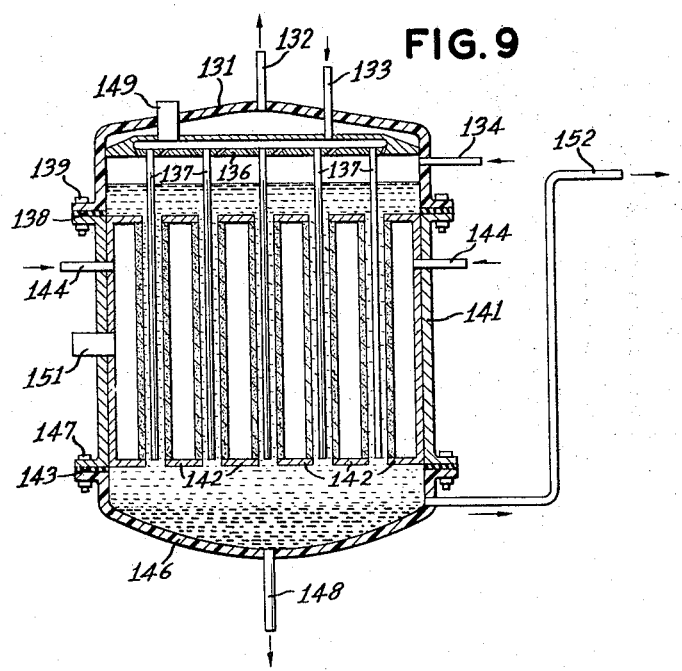

The apparatus illustrated in the accompanying FIGURE 9 typically illustrates a fuel cell adapted to the use of liquid barium amalgam. The cell is similar to that of the three-compartment apparatus shown in FIGURE 4 and comprises cell cover 131 fitted with horizontal distributor plate 136 connected to barium amalgam inlet 133 and has suspended therefrom a plurality of steel anodes 137. The cell cover is fitted with outlet 132 for venting. The upper section is fastened to the middle section by bolt means 139, for example, and is insulated therefrom by means of insulator plate 138 which is suitably made of hard rubber, Teflon, polyethylene, Kel-F, etc. Electrolyte is fed to the cell by means of inlet 134 fitted in the top section of the cell.

Gas diffusion electrodes 142 are positioned within the middle section of the cell and are fed with oxidant by means of inlet 144. The middle section (metallic) is fastened to lower portion 146 by bolt means 147 and is separated therefrom by insulator plate 143, the bottom section having a sloping lower surface. In operation, barium amalgam introduced through line 133 passes through the apertures of plate 136 such that the amalgam flows downwardly as a continuous stream along the surface of anodes 137, the spent or lean amalgam falling by gravity to the sloping lower surface of the cell. As a pool of spent amalgam accumulates in the bottom of the cell, it is withdrawn therefrom through outlet 148. Electrolyte is withdrawn by means of pipe 152 fitted in the lower portion of the cell and above the spent amalgam which settles to the bottom. The height of the electrolyte within the cell is conveniently controlled by the height of pipe 152. In operation, the electrodes are preferably totally immersed in the electrolyte which fills part of the top section of the cell. The electrolyte height is conveniently controlled by outside overflow from pipe 152 which, as shown in the drawing, extends to the height of electrolyte within the cell. The current is withdrawn from the system by electrical connections to anode and cathode terminals 149 and 151, respectively.

It is to be understood that various modifications of the apparatus of FIGURES 3–9 of the accompanying drawings may be made without departing from the scope of the present teachings. For example, the cells may be provided with any suitable means for circulating the aqueous electrolyte such as stirring means or a draft pipe to minimize local build-up of electrolyte concentration or temperature.

The following examples are offered as a further understanding of the present invention and are not to be construed as unnecessarily limiting thereto. Each experiment was conducted in an apparatus comprising a 1-liter glass vessel filled with aqueous electrolyte having immersed therein a gas electrode and a barium metal electrode. The barium electrode or anode consisted of a piece of barium metal into which copper probes attached to a copper rod were inserted. The copper rod and the side and back of the barium metal were coated with methyl methacrylate resin or epoxy resin to prevent further oxidation or attack of the barium metal while standing or during operation of the cell. The system was static, i.e., no electrolyte circulation was used during the experimentation. In each instance the open circuit potential of the cell was recorded, as well as the potential obtained under various loads imposed by a resistance circuit, the current densities (expressed as amperes per square foot of apparent electrode surface) being calculated from the output current expressed in milliamperes (ma.).

*Example 1*

In this example the electrolyte employed was aqueous barium hydroxide which, upon analysis, was found to contain 0.215 mol per liter of barium ion and 0.424 mol per liter of hydroxyl ion. The oxidant was gaseous oxygen introduced into a gas diffusion electrode of porous silver under a pressure sufficient to allow for passage of the gaseous oxygen through the porous silver. The barium anode consisted of a piece of barium metal about 0.5 inch in thickness, having a surface area of 0.153 square inch. The cell was operated at 40° C. at which the open circuit potential was 2.55 volts. The results obtained at various loads are tabulated in the following Table I.

TABLE I

| Cell Voltage (volts) | Output Current (ma.) | Current Density (amps/ft.$^2$) |
| --- | --- | --- |
| 2.55 | ---------- | ---------- |
| 1.55 | 90 | 87 |
| 1.5 | 150 | 144 |
| 1.46 | 210 | 203 |
| 1.36 | 270 | 259 |
| 1.35 | 310 | 297 |
| 1.35 | 310 | 297 |
| 1.9 | 160 | 154 |
| 1.75 | 100 | 96 |

*Example 2*

In this example the electrolyte employed was an aqueous barium hydroxide solution saturated in barium ion and in hydroxyl ion. The oxidant employed was gaseous oxygen and was introduced into a porous silver electrode as described in accordance with Example 1, above. The barium anode consisted of barium metal having a surface area of 0.145 square inch. The cell was operated at room temperature (about 25° C.) and had an open circuit potential of 2.6 volts. The results obtained at various loads are given in the following Table II.

TABLE II

| Cell Voltage (volts) | Output Current (ma.) | Current Density (amps/ft.$^2$) |
| --- | --- | --- |
| 2.6 | ---------- | ---------- |
| 2.0 | 40 | 40 |
| 1.6 | 100 | 100 |
| 1.3 | 180 | 180 |
| 1.0 | 240 | 240 |
| 0.7 | 300 | 300 |

*Example 3*

In this example the electrolyte employed was aqueous barium hydroxide which, upon analysis, was found to contain 0.186 mol per liter of barium ion and 0.353 mol per liter of hydroxyl ion. The oxidant was gaseous oxygen introduced through a porous silver gas diffusion electrode in accordance with the procedure employed in Example 1, above. The barium anode consisted of a piece of barium metal having a thickness of 0.75 inch and a diameter of 0.68 inch. The cell was operated at 25° C. and had an open circuit potential of 2.65 volts. The results obtained at various loads are set forth in the following Table III.

TABLE III

| Cell Voltage (volts) | Output Current (ma.) | Current Density (amps/ft.²) |
|---|---|---|
| 2.65 | -------- | ---------- |
| 1.95 | 160 | 69 |
| 1.62 | 300 | 130 |
| 0.91 | 670 | 290 |
| 1.28 | 480 | 214 |
| 2.60 | -------- | ---------- |

*Example 4*

The electrolyte employed in this example was an aqueous solution of sodium hydroxide and barium chloride containing 0.43 mol per liter of barium ion, 0.649 mol per liter of hydroxyl ion, 0.88 mol per liter of chloride ion and 0.65 mol per liter of sodium ion. The oxidant employed was gaseous chlorine introduced through a porous non-catalyzed graphite cathode under a pressure sufficient to cause the gaseous chlorine to pass through the porous graphite and disperse at the electrode interphase (gas-liquid). The graphite cathode had a total porosity of 0.170 cc./gram, 85 percent of the pore volume being composed of pores having a diameter within the range 4–0.4 microns. The barium anode consisted of a piece of barium metal having a diameter of 0.68 inch. The cell was operated at 25° C. and had an open circuit potential of 3.5 volts. The results obtained at various loads are given in the following Table IV.

TABLE IV

| Cell Voltage (volts) | Output Current (ma.) | Current Density (amps/ft.²) |
|---|---|---|
| 3.5 | -------- | ---------- |
| 1.97 | 400 | 173 |
| 2.40 | 200 | 86 |
| 1.63 | 600 | 260 |

*Example 5*

The electrolyte employed in this example was an aqueous solution of sodium hydroxide and barium chloride having an initial composition of 1.62 mols per liter of barium ion, 0.274 mol per liter of hydroxyl ion and 3.39 mols per liter of chloride ion. The oxidant employed was gaseous chlorine supplied from a cylinder introduced into a porous graphite cathode in accordance with the procedure of Example 4, above, 85 percent of the pore volume of the cathode being composed of pores having a diameter of 2 to 0.3 microns. The cell was operated at 25° C. and had an open circuit potential of 3.4 volts. The results obtained with this system under various loads are given in the following Table V.

TABLE V

| Cell Voltage (volts) | Output Current (ma.) | Current Density (amps/ft.²) |
|---|---|---|
| 3.4 | -------- | ---------- |
| 2.8 | 250 | 108 |
| 1.4 | 650 | 280 |
| 0.3 | 1,000 | 431 |
| 3.4 | -------- | ---------- |

*Example 6*

This example is a continuation of the run described above as Example 5 except that the temperature of the cell was raised to 30° C., again employing gaseous chlorine as the oxidant and barium metal as the fuel. The open circuit potential under these conditions was 3.4 volts, the results at various loads being given in the following Table VI.

TABLE VI

| Cell Voltage (volts) | Output Current (ma.) | Current Density (amps/ft.²) |
|---|---|---|
| 3.4 | -------- | ---------- |
| 2.5 | 300 | 130 |
| 2.9 | 180 | 78 |
| 1.3 | 700 | 302 |
| 3.4 | -------- | ---------- |
| 0.25 | 1,000 | 431 |
| 3.3 | -------- | ---------- |

In each of Tables I–VI, the results are given in the order actually taken to show the response of the fuel cell system to change in load. In each of the above experiments the response to the various loads was instantaneous and in each instance the open circuit potential obtained initially was also obtained instantaneously when the load imposed upon the cell was removed.

Figure 1:
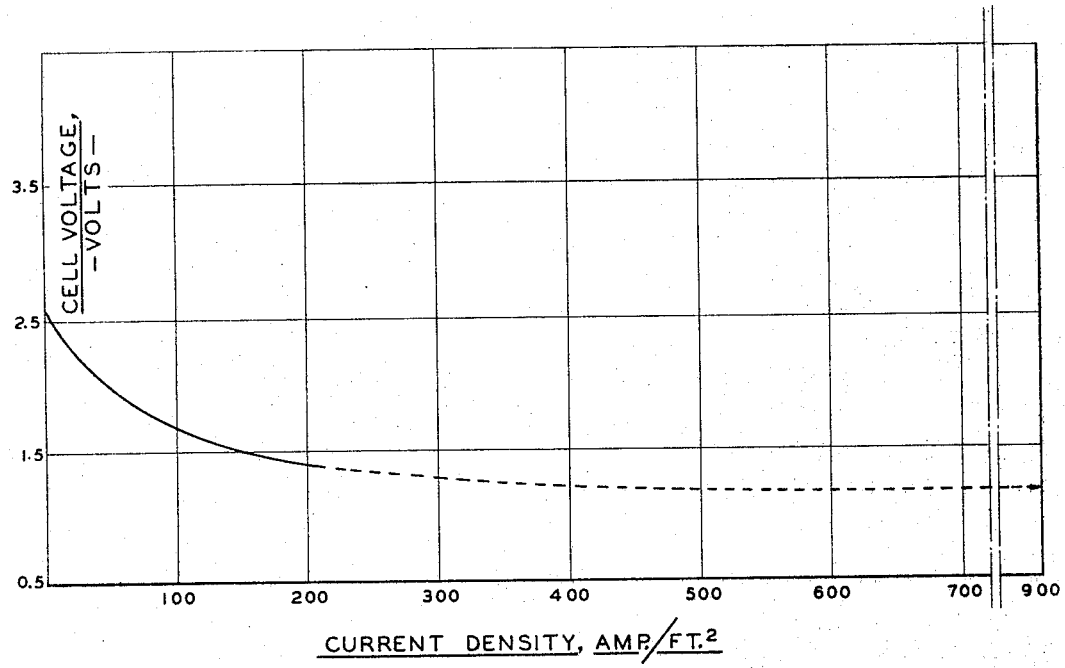

The experimental results of Examples 1–3 were used as the basis of the above-discussed power curve shown in the accompanying graph of FIGURE 1, the dotted portion of the curve being an extrapolation showing the voltage chaarcteristics of the system at higher current densities. Inspection of the power curve for the barium-oxygen system shows that the open circuit potential was above 2.5 volts and that at high current densities the cell potential is substantially above one volt.

Figure 2:
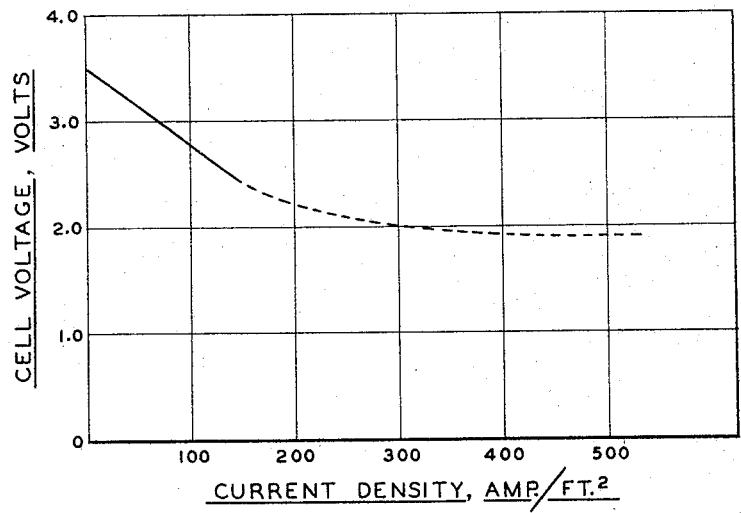

The experimental results obtained in accordance with Examples 4–6 above were used as the basis of the power curve shown in the accompanying graph of FIGURE 2. The dotted portion of the curve is also based on experimental data obtained at higher current densities which were corrected to account for the tendency of the electrode surface to increase in temperature. Inspection of the power curve for the barium-chlorine system shows that the open circuit potential was about 3.5 and that at higher current densities the cell potential of this system is also substantially higher than the barium-oxygen system, being close to about 2 volts.

It is apparent that by the process of this invention, an improved fuel cell is provided capable of generating power higher than that of presently known fuel cells. Other advantages are that this increased power is realized at ambient temperatures and uses an aqueous medium. In addition, valuable products such as solid alkaline earth metal hydroxides are readily separated and recoved from the aqueous electrolyte medium.

It is to be understood that various alterations and modifications of the process and apparatus described herein may become apparent to those skilled in the art without departing from the scope of this invention.

Having described my invention, I claim:

1. A method for the generation of electrical energy which comprises providing an electrochemical cell containing an aqueous alkaline electrolyte bath comprising hydroxyl anions and barium cations and having an anode and cathode disposed therein, said anode being in contact with a material selected from the group consisting of elemental barium in the solid state, a solid alloy of barium at least 50 percent by weight of the alloy being barium, and a liquid amalgam of barium, passing an oxygen-containing gas into said cell such that it is contacted with said cathode, operating the cell at a temperature between about 20° C. and about 250° C., barium being converted electrochemically at the anode to produce barium cations and oxygen being converted electrochemically at said cathode to produce hydroxyl anions with generation of electrical energy.

2. A method for generating electrical energy which comprises providing an electrochemical cell containing an aqueous alkaline electrolyte bath and having an anode and cathode disposed therein, said anode being in contact with elemental barium in the solid state, the electrolyte bath comprising barium hydroxide, passing an oxygen-containing gas into the cell such that it is contacted with the cathode, operating said cell at a temperature between about 20° C. and about 90° C., barium undergoing electrochemical conversion at the anode to produce barium cations and oxygen being converted electrochemically at the cathode to produce hydroxyl ions with generation of electrical energy.

3. A method for the generation of electrical energy which comprises providing an electrochemical cell containing an aqueous electrolyte bath containing a water soluble metal chloride selected from the group consisting of an alkali metal chloride and an alkaline earth metal chloride, and having an anode and cathode disposed therein, said anode being in contact with an alkaline earth metal in its elemental and solid state, passing chlorine into said cell such that it is contacted with the cathode, operating said cell at a temperature between about 20° C. and about 250° C. such that the aqueous electrolyte bath is maintained in the liquid phase, the alkaline earth metal undergoing electrochemical reaction at the anode to provide corresponding cations and the chlorine undergoing electrochemical reaction at the cathode to produce chloride anions with generation of electrical energy.

4. The method of claim 3 in which said aqueous medium is alkaline.

5. The method of claim 4 in which said aqueous alkaline electrolyte bath comprises an alkali metal hydroxide.

6. A method for the generation of electrical energy which comprises providing an electrochemical cell containing an aqueous electrolyte bath containing a water soluble metal chloride selected from the group consisting of an alkali metal chloride and an alkaline earth metal chloride, and having an anode and cathode disposed therein, said anode being in contact with barium in its elemental and solid state, passing gaseous chlorine into said cell such that it is contacted with said cathode, maintaining the aqueous electrolyte bath in the liquid phase and at a temperature between about 20° C. and about 90° C., barium reacting at the anode to provide barium cations and chlorine reacting at the cathode to provide chloride anions with generation of electrical energy.

7. The method of claim 6 in which said aqueous electrolyte bath comprises an alkali metal hydroxide.

8. A fuel cell for the generation of electrical energy by the electrochemical reaction of a solid fuel and a gaseous oxidant which comprises in combination a liquid electrolyte bath having vertically disposed therein a plurality of anodes in contact with a solid fuel as the anodic reactant and a plurality of gas diffusion electrodes in alternating relationship to said anodes, the anodes and cathodes being spaced apart from one another and having liquid electrolyte bath between the opposing reactive anodic and cathodic surfaces, a movable casing within which the electrolyte bath is contained and to which the anodes and cathodes are connected, said casing being provided with means for effectuating movement thereof and of the anodes and cathodes which are connected thereto towards one another as the solid fuel is converted by the electrochemical conversion thereof, means for introducing a gaseous oxidant to said gas diffusion cathodes, means for introducing liquid electrolyte bath to the cell, and means for withdrawing liquid electrolyte bath from the cell.

9. The fuel cell of claim 8 in which a portion of the movable casing is in the form of a bellows.

10. A fuel cell for the generation of electrical energy by the electrochemical reaction of a solid fuel and a gaseous oxidant which comprises in combination a liquid electrolyte bath having vertically disposed therein a plurality of anodes in contact with a solid fuel as the anodic reactant and a plurality of gas diffusion electrodes in alternating relationship to said anodes, the anodes and cathodes being spaced apart from one another and having liquid electrolyte bath therebetween as the sole medium separating the opposing reactive anodic and cathodic surfaces, means for introducing gaseous reactant to said gas diffusion cathodes, a substantially closed movable cell casing within which the electrolyte bath is contained and to which each of the anodes is connected, means for exerting pressure on said movable cell casing to effectuate movement of said casing inwardly thereby causing movement of said anodes connected thereto, and means for effectuating movement of said gas diffusion cathodes such that the gap between said anodes and cathodes is maintained substantially constant as the solid fuel is consumed, means for introducing liquid electrolyte bath to the cell, and means for withdrawing liquid electrolyte bath from the cell.

11. A method for the generation of electrical energy which comprises providing an electrochemical cell containing an aqueous electrolyte bath and having at least one anode and at least one cathode disposed therein, said anode being in contact with a material selected from the group consisting of an alkaline earth metal in its elemental and solid form, a solid alloy of an elemental alkaline earth metal at least 50 percent by weight of the alloy being an alkaline earth metal, and a liquid amalgam of an elemental alkaline earth metal, passing an oxidant comprising an oxygen-containing gas into said cell such that it is brought into contact with the cathode, the aqueous electrolyte bath comprising hydroxyl anions and alkaline earth metal cations, operating said cell at a temperature between about 20° C. and about 250° C. such that the aqueous electrolyte bath is maintained in the liquid phase, the alkaline earth metal reacting at the anode to form corresponding alkaline earth metal cations and oxygen reacting at the cathode to produce hydroxyl anions with generation of electrical energy.

12. The method of claim 11 in which said oxygen-containing gas is air.

13. The method of claim 11 in which said elemental alkaline earth metal is barium.

14. The method of claim 11 in which said elemental alkaline earth metal is strontium.

15. The method of claim 11 in which said elemental alkaline earth metal is calcium.

16. The method of claim 11 in which said alkaline earth metal is in its elemental and solid form.

17. The method of claim 11 in which said alkaline earth metal is in the form of a solid alloy at least 50 percent by weight of the alloy being alkaline earth metal.

18. The method of claim 11 in which said alkaline earth metal is in the form of a liquid amalgam.

19. A method for the generation of electrical energy which comprises providing an electrochemical cell containing an aqueous electrolyte bath and having at least one anode and at least one cathode disposed therein, said anode being in contact with a material selected from the group consisting of an alkaline earth metal in its elemental and solid state, a solid alloy of an elemental alkaline earth metal at least 50 percent by weight of the alloy being an alkaline earth metal, and a liquid amalgam of an elemental alkaline earth metal, passing an oxidant comprising halogen into said cell such that it is brought into contact with said cathode, the aqueous electrolyte bath comprising halide anions and alkaline earth metal cations, operating said cell at a temperature between about 20° C. and about 250° C. such that the aqueous electrolyte bath is maintained in the liquid phase, alkaline earth metal reacting at the anode to produce corresponding alkaline earth metal cations and halogen reacting at the cathode to produce halide anions with generation of electrical energy.

20. The method of claim 19 in which said elemental alkaline earth metal is barium.

21. The method of claim 19 in which said elemental alkaline earth metal is strontium.

22. The method of claim 19 in which said elemental alkaline earth metal is calcium.

23. The method of claim 19 in which said halogen is chlorine.

24. The method of claim 19 in which said alkaline earth metal is in its elemental and solid form.

25. The method of claim 19 in which said alkaline earth metal is in the form of a solid alloy at least 50 percent by weight of the alloy being alkaline earth metal.

26. The method of claim 19 in which said alkaline earth metal is in the form of a liquid amalgam.

References Cited by the Examiner

UNITED STATES PATENTS

| | | | |
|---|---|---|---|
| 852,464 | 5/1907 | Sokal | 136—160.3 |
| 2,921,110 | 1/1960 | Crowley et al. | 136—86 |
| 2,976,342 | 3/1961 | Morehouse et al. | 136—86 X |
| 3,031,518 | 4/1962 | Werner et al. | 136—86 |
| 3,043,898 | 7/1962 | Miller et al. | 136—86 |

OTHER REFERENCES

Survey of State of the Art Fuel Cell Development, Mar. 30, 1961, pp. 82–84.

WINSTON A. DOUGLAS, *Primary Examiner.*

JOHN R. SPECK, ALLEN B. CURTIS, H. FEELEY, *Examiners.*